United States Patent [19]
Clarke-Pounder

[11] 3,870,635
[45] Mar. 11, 1975

[54] APPARATUS FOR CLARIFYING AN INFLUENT WATER

[75] Inventor: Ian J. H. Clarke-Pounder, Pennington, N.J.

[73] Assignee: Improved Machinery Inc., Nashua, N.H.

[22] Filed: June 24, 1974

[21] Appl. No.: 482,076

Related U.S. Application Data

[63] Continuation of Ser. No. 314,797, Dec. 13, 1972, abandoned.

[52] U.S. Cl.................. 210/221, 209/168, 261/124
[51] Int. Cl.............................................. B03d 1/00
[58] Field of Search ......... 210/44, 220, 221, 13, 14; 209/164, 173, 166–169; 261/124, 77

[56] References Cited
UNITED STATES PATENTS

| | | | |
|---|---|---|---|
| 2,695,710 | 11/1954 | Gibbs | 210/44 |
| 3,336,016 | 8/1967 | Schreiber | 261/124 |
| 3,642,618 | 2/1972 | Silva | 210/44 |
| 3,829,070 | 8/1974 | Reba | 261/77 |

FOREIGN PATENTS OR APPLICATIONS

1,004,505   3/1952   France.................................. 210/221

Primary Examiner—Thomas G. Wyse
Assistant Examiner—Benoit Castel
Attorney, Agent, or Firm—Robert R. Paquin

[57] ABSTRACT

Apparatus for clarifying an influent water (such as sewage and other solid/liquid slurries), by gas stimulated flotation of solid material, wherein the influent water is generally upwardly supplied into a generally vertically elongated clarifying chamber at a location substantially spaced above the lower end thereof, and gaseous bubbles intermixed with carrier liquid are discharged to the clarifying chamber at a second location substantially spaced below said supply of the influent water thereto, the gaseous bubbles being produced immediately adjacent to their said discharge and the discharged gaseous bubbles being permitted to readily rise in the chamber in cloud form to cause upward movement of solid material in the influent water while liquid flows downwardly through the chamber.

2 Claims, 5 Drawing Figures

3,870,635

APPARATUS FOR CLARIFYING AN INFLUENT WATER

This is a continuation of application Ser. No. 314,797, filed Dec. 13, 1972, now abandoned.

The present invention relates generally to apparatus for clarifying influent waters such as sewage and other solid/liquid slurries and more particularly to apparatus and methods wherein an influent water is clarified by gas stimulated flotation of solid material in the influent water.

In conventional clarifying apparatus of this general type, the gas has been frequently supplied to the clarifying chamber either intermixed with the influent water or at a location closely adjacent the supply of the influent water. However, it is believed that both of these conventional arrangements inherently favor gas bubble attachment onto the larger solid particles in the influent water, thereby depriving the smaller solid particles of sufficient gaseous bubbles to effect their flotation. Also, it is further believed that both of these arrangements deter the flocculation of small solid particles and cause the gas to create turbulence in the influent water such as induces the fragmentation of solid agglomerates into smaller fragments. In addition, said conventional apparatus and methods generally employ a clarifying chamber impossible to suitably fill with gaseous bubbles; and a large volume of such clarifying chamber is normally substantially devoid of gaseous bubbles and, hence, provides only minimal clarification. For these and other reasons, said conventional apparatus and methods fail to provide effective separation of small particle solid material, particularly as compared with settling-type clarifiers.

In other conventional clarifying apparatus of this general type, the influent water and gas have been supplied to the clarifying chamber on opposite sides of a separating medium (for example, a screen and/or fill) which transversely extends the full cross-section of the clarifying chamber. Such separating medium, however, causes undesireable agglomeration of the supplied gaseous bubbles to large size, thereby preventing the provision of a rising cloud of relatively small gaseous bubbles in the clarifying chamber; and the large gaseous bubbles further undesireably reduce the flow area for liquid flowing downwardly through the clarifying chamber. Also, the employment of the separating medium inherently restricts the flow of high specific gravity solids to the lower end of the clarifying chamber from which location they might be otherwise readily discharged; and such solids, being collected by the separating medium, plug the latter to undesirably reduce the flow area of the clarifying chamber.

Furthermore, in conventional clarifying apparatus of this general type, the influent water is generally supplied into the clarifying chamber in a direction transverse to the rising gas bubbles. This arrangement however, is believed to cause the supplied influent water to create unstable flow regimes in the clarifying chamber, thereby causing undesirable gross turbulence such as promotes the discharge of smaller solid particles with the discharged liquid, as well as induce the fragmentation of solid agglomerates into smaller fragments.

An object of the present invention is to provide new and improved apparatus particularly adapted for providing more efficient clarification of influent water by gas stimulated flotation of solid material contained in the influent water.

Another object of the invention is to provide new and improved apparatus of the type set forth particularly adapted for providing more efficient separation of small particle solid material from the influent water.

Another object is to provide new and improved apparatus of the type set forth particularly adapted for operation at high throughput per unit of cross-section of the clarifying chamber.

Another object is to provide new and improved apparatus of the type set forth particularly adapted for providing high quality, clarified liquid or effluent.

Another object is to provide new and improved apparatus of the type set forth particularly adapted whereby the influent water is supplied to the clarifying chamber in a manner substantially minimizing the creation of flow regimes causing movement of small solid particles towards the clarified liquid outlet.

Another object is to provide new and improved apparatus of the type set forth particularly adapted for discharging solids in the form of high consistency sludge.

Another object is to provide new and improved apparatus of the type set forth particularly adapted to possess only relatively low gas and power requirements.

Another object is to provide new and improved apparatus of the type set forth particularly adapted to be relatively economical in the total of its capital and operating costs.

Other objects and advantages of the invention will be apparent from the following description taken in connection with the accompanying drawings wherein, as will be understood, the preferred embodiments of the invention have been given by way of illustration only.

In accordance with the invention, apparatus for clarifying an influent water, may comprise a vessel containing a generally vertically elongated clarifying chamber, influent water supply means operatively associated with the clarifying chamber for generally upwardly supplying an influent water into said clarifying chamber at a location substantially spaced above the lower end thereof, gas supply means for producing gaseous bubbles and discharging such bubbles intermixed with carrier liquid into the clarifying chamber, such gas supply means being operatively associated with the clarifying chamber for producing the gaseous bubbles immediately adjacent to the discharge thereof into the clarifying chamber and also for discharging the gaseous bubbles into the clarifying chamber at a second location substantially spaced longitudinally thereof below said location at which the influent water is supplied thereto, solid material discharge means operatively associated with the clarifying chamber for discharging solid material from adjacent the upper end thereof, liquid discharge means operatively associated with the clarifying chamber for discharging liquid from adjacent the lower end thereof, and the portion of the clarifying chamber between said location and said second location being free of transversely extending filtering media to permit the gaseous bubbles supplied at said second location to readily rise in the clarifying chamber and cause upward movement of solid material contained in a supplied influent water while liquid in the influent water passes downwardly to the liquid discharge means.

Referring to the drawings.

Figure 1:
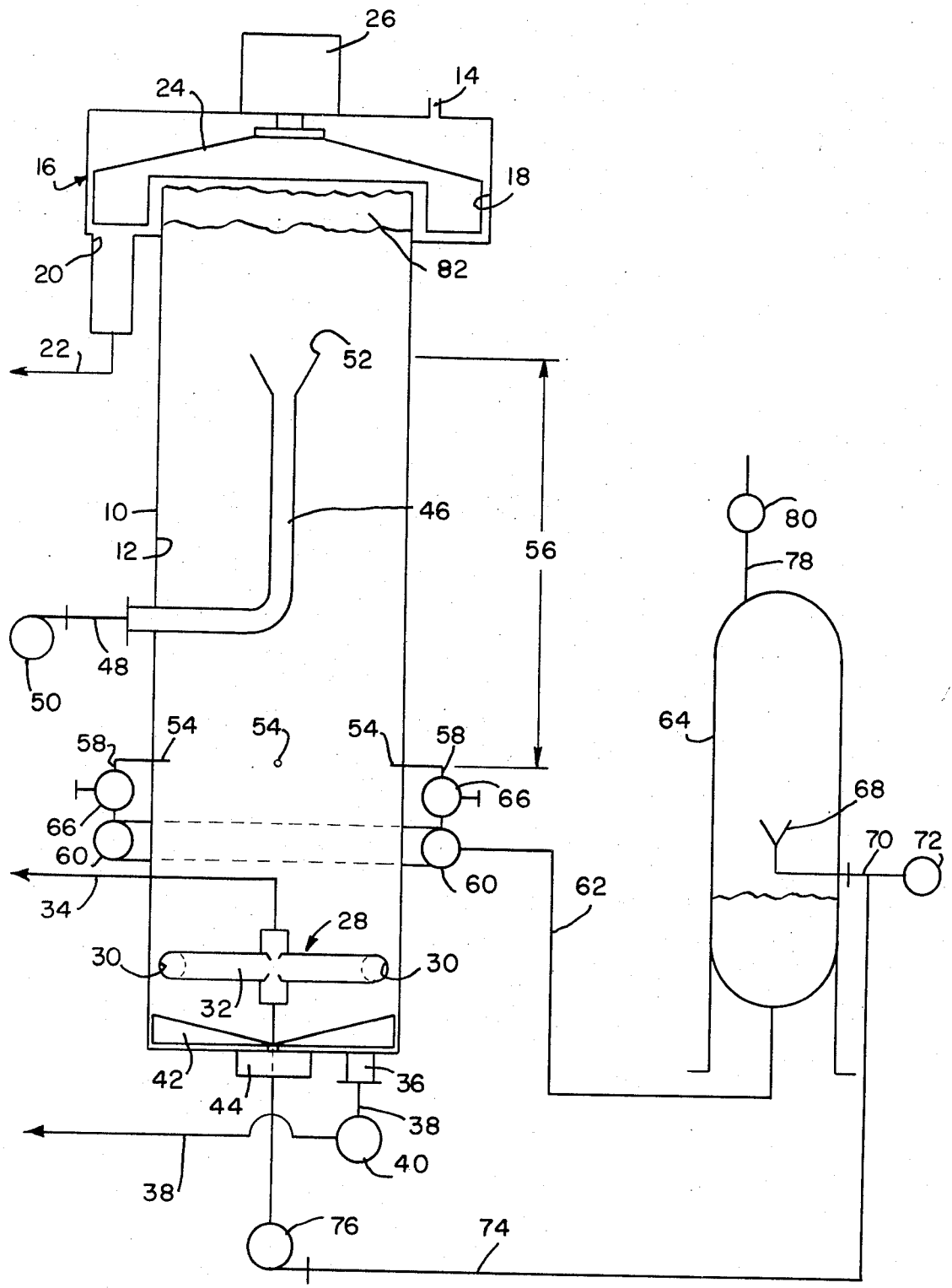
FIG. 1 is a view schematically depicting an apparatus constructed in accordance with one embodiment of the invention.

Referring more particularly to the drawings wherein similar reference characters designate corresponding parts throughout the several views, FIG. 1 illustrates an embodiment of the invention in the form of a clarifying apparatus comprising a generally upright or vertical, annular vessel 10 containing a generally vertically elongated, totally enclosed clarifying chamber 12 and provided with a gas outlet 14 operatively associated with the upper end of the chamber 12 for discharging gas therefrom. A solid material or sludge discharge means, designated generally as 16, is operatively associated with the clarifying chamber 12 for discharging separated solid material from adjacent the upper end thereof. As illustrated in FIG. 1, the solid material discharge means 16 comprises an annular circumferential discharge chamber 18, provided with a discharge outlet 20 connected to a discharge conduit or pipe schematically depicted by the arrow 22, which is open to the chamber upper end, and a rotary top scraper 24 which is rotatably driven by a motor 26.

A clarified liquid or effluent discharge means, designated generally as 28, is operatively associated with the clarifying chamber 12 for discharging the clarified liquid from adjacent the lower end thereof. The discharge means 28, as illustrated, comprises a plurality of discharge outlets 30 substantially spaced across the cross-section of the vessel 10 adjacent to the lower end thereof, and a discharge header 32 communicating the outlets 30 with discharge piping schematically depicted by the arrow 34. The lower end of the vessel 10 is also provided with a heavy settleable solids discharge outlet 36, communicating with the lower end of the chamber 12 and connected to a discharge conduit schematically depicted by the arrow 38 having therein a conventional trash pump 40, and contains a rotary bottom scraper 42 driven by a motor 44.

The influent water supply means of the illustrated apparatus is particularly adapted for generally upwardly supplying the influent water into the chamber 12 at low velocity at an elevation substantially spaced above the chamber lower end. More specifically, an influent water supply conduit 46, communicating through a conduit 48 to receive influent water pumped from a source (not shown) by a conventional pump 50, projects into the chamber 12 intermediate the ends thereof and then upwardly extends generally centrally of the chamber 12. The conduit 46 terminates in an upwardly facing diffuser nozzle 52 which is generally centrally of the chamber 12 and at a vertical location or elevation substantially spaced above the chamber lower end, the vertical distance between the diffuser nozzle 52 and the chamber upper end being at the most twice the transverse dimension or diameter of the thereadjacent portion of the chamber 12. The gas supply means of the apparatus comprises an annulus of bubble producing nozzles 54 which are arcuately spaced around the chamber 12 at a second vertical location or elevation substantially spaced below the diffuser nozzle 52 by at least the maximum transverse dimension or diameter of the therebetween portion 56 of the clarifying chamber 12. The nozzles 54, as shown in FIG. 1, are more adjacent to the lower end of the chamber 12 than to the upper end thereof, but above the discharge outlets 30 and 36.

The portion 56 of the chamber 12 is free of transversely extending separating media and contains neither a transversely extending screen nor fill. Hence, gaseous bubbles supplied by the nozzles 54 can, without undesirable agglomeration, readily and freely rise in cloud form and cause upward movement of solid material contained in a supplied influent water while the liquid in such influent water passes downwardly to the clarified liquid discharge means 28.

The nozzles 54 are arranged to each discharge gaseous bubbles to the clarifying chamber 12 in a direction at least generally transversely or radially of the chamber 12 from a position adjacent the inner periphery of the vessel wall and substantially spaced across the cross-section of the chamber 12 from the opposing portion of such wall. The nozzles 54 are each sized to produce gaseous bubbles (average size not greater than 85 microns) and, as hereinafter explained, discharge the gaseous bubbles in mixture with carrier liquid. Hence, the gaseous bubbles are produced immediately adjacent to (that is, at the locations of or immediately prior to) the discharge of the gas intermixed with carrier liquid into the chamber 12; and resultantly agglomeration of the gaseous bubbles prior to discharge into the chamber 12 is precluded.

The nozzles 54 are connected through individual conduits 58 to an annular header 60 encircling the vessel 10, the header 60 being, in turn, connected through a conduit 62 to receive a gaseous/liquid mixture from a pressurized absorption vessel 64. The conduits 58 may, as shown, each contain a shut-off valve 66 permitting selective employment of the nozzles 54, the valves 60 for the nozzles 54 in use, as will be understood, being maintained fully open. The vessel 64 contains a spray nozzle 68 which is connected through a conduit 70 to a conventional compressor 72, whereby the gas compressed by the compressor 72 is supplied into the vessel 64 through the conduit 70 and nozzle 68; and the conduit 70 is further connected to the discharge header 32 by a re-cycle conduit 74, having therein a conventional pump 76, to simultaneously re-cycle a minor portion of the clarified liquid to the vessel 64. The vessel 64 at its upper end is provided with a vent 78 which contains a conventional pressure relief valve 80.

During the operation of the beforedescribed apparatus, both re-cycled clarified liquid and gas (for example, compressed air at 50 to 100 psig) are continuously simultaneously supplied into the vessel 64 through the conduit 70 and spray nozzle 68, whereby the air is intermixed with, and thereby dissolved in, the liquid in the vessel 64 under pressure. This air, dissolved in carrier liquid, is continuously supplied from the vessel 64 to the clarifying chamber 12 through the conduit 62, header 60, conduits 58 and the bubble producing nozzles 54. As the pressure in the chamber 12 is at essentially atmospheric pressure, the dissolved air in carrier liquid comes out of solution adjacent to the locations of its injection by the nozzles 54 into the chamber 12, thereby forming a rising cloud of fine air bubbles extending completely across the cross-section of the chamber 12, while the accompanying carrier liquid passes downwardly to the outlets 30.

Simultaneously, the influent water to be clarified is continuously generally upwardly supplied into the upper end of the chamber 12 through the diffuser nozzle 52, the generally upward supply of the influent water substantially minimizing the creation of flow regimes such as would cause movement of small solid particles towards the outlets 30. Adjacent to the chamber upper end, the rising cloud of fine air bubbles effects flotation of particles of solid material (other than heavy settleable solids) from the influent water, such particles of solid material rising to form a sludge blanket 82 at the chamber upper end; and said rising solid particles, in turn, induce flocculation and agglomeration of additional particles of solid material.

The liquid component of the influent water, together with any remaining small particles of solid material which are not floated adjacent the chamber upper end, flow downwardly in the chamber portion 56 countercurrent to the rising air bubble cloud through the interstices or tortuous passageways between the individual air bubbles. During this downward flow, the rising air bubbles effect agglomeration flotation of such remaining particles (other than the heavy settleable solids of solid material.

The heavy settleable solids are separated from the liquid by gravity and discharged through the outlet 36; the sludge from the blanket 82 is discharged by the rotatably driven top scraper 24 through the discharge chamber 18 and outlet 20. A portion of the air is discharged with the sludge 82; and another portion thereof exhausts through the gas outlet 14. The clarified liquid is discharged through the outlets 30 to the discharge header 32; and, while a major portion of this discharged clarified liquid flows from the apparatus through the conduit 34, a minor portion thereof is recycled through the conduit 74 to the vessel 64 for intermixture with the air supplied by the compressor 72 and supply through the nozzles 54.

Figure 2:
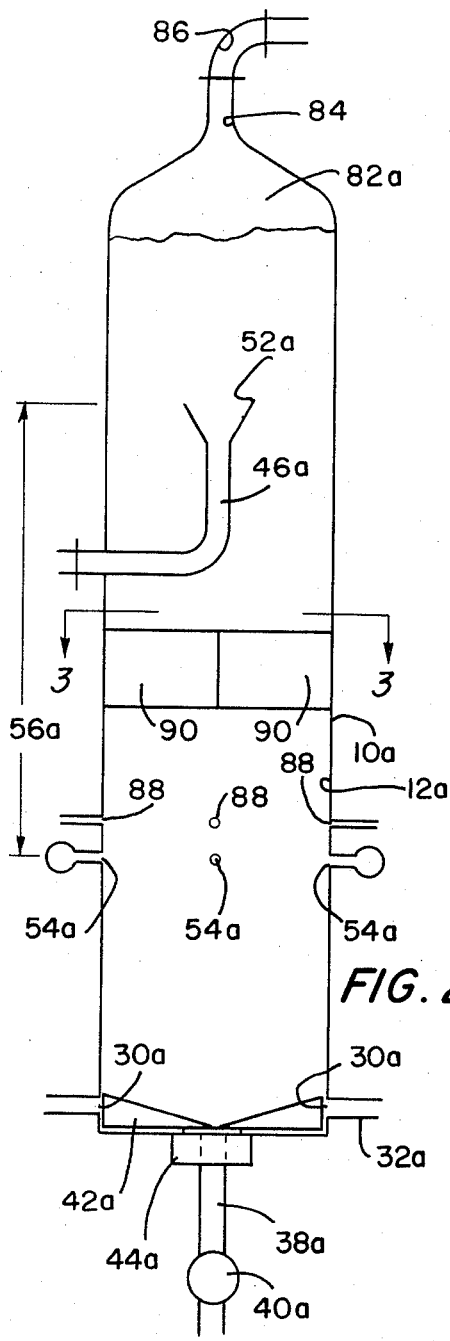
FIG. 2 is a view schematically depicting an apparatus constructed in accordance with an alternative embodiment of the invention.
Figure 3:
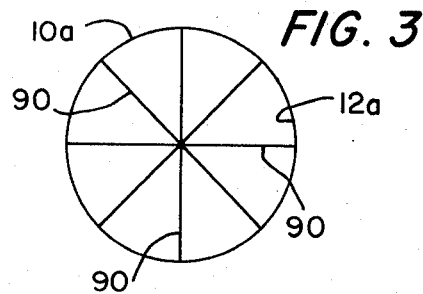
FIG. 3 is a sectional view taken on line 3—3 of FIG. 2, looking in the direction of the arrows.

FIGS. 2 and 3, wherein parts corresponding to those beforedescribed are designated by the similar reference numeral followed by the suffix a, schematically depicts an apparatus representing a modified embodiment of the invention. As shown in such FIGS., the solid material or sludge discharge means of the apparatus is constructed for pressurized discharge of the sludge and comprises an outlet 84 connected to discharge the solid material through a conduit 86, thereby avoiding the necessity for rotating scrapers and the like. Also, in the embodiment of such FIGS., suitable treatment chemical (for example, a polymeric coagulant for assisting flocculation and uniting of the small particles of solid material) is introduced into the clarifying chamber 12a through chemical inlet nozzles 88 arcuately spaced around the periphery of the chamber 12a at a vertical location or elevation closely spaced above the nozzles 54a which supply the gaseous bubble/carrier liquid mixture. In addition, the portion 56a of the clarifying chamber 12a includes a plurality of vertically extending, generally radial vanes 90 having their lower ends substantially spaced above the nozzles 54a, the vanes 90 serving to insure prevention of gross turbulence of fluid in the chamber portion 56a without undesireably interfering with the rising air bubbles and downwardly flowing liquid. Except in these respects, however, the embodiment of FIGS. 2 and 3 is identical to that of FIG. 1; and, as will be understood, any of the added features of the apparatus of FIGS. 2 and 3 could, if desired, be incorporated in the FIG. 1 apparatus.

The operation of the apparatus of FIGS. 2 and 3 is identical to that of the FIG. 1 apparatus except that chemical is supplied to the clarifying chamber 12a and the floated solid material or sludge is discharged through the before-described pressurized discharge.

Figure 4:
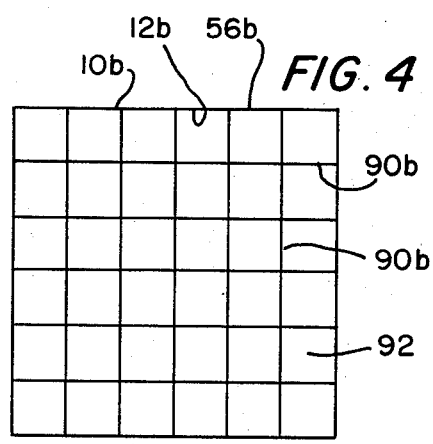
FIG. 4 is a sectional view schematically depicting an apparatus constructed in accordance with another alternative embodiment of the invention.

As shown in FIG. 4, wherein parts corresponding to those beforedescribed are designated by the similar reference numeral followed by the suffix b, the vessel 10b may be of square or other polygonal cross-section. Also, the chamber portion 56b may be provided with intersecting vanes 90b extending completely across the chamber 12b, the intersecting vanes 90b therebetween defining channels 92 of sufficient size to preclude their screening of solid particles. Except in these respects, however the embodiment of FIG. 4 is identical to that of FIGS. 2 and 3; and, as will be understood, any of the added features of the FIG. 4 embodiment could be included in the embodiment of FIG. 1.

Figure 5:
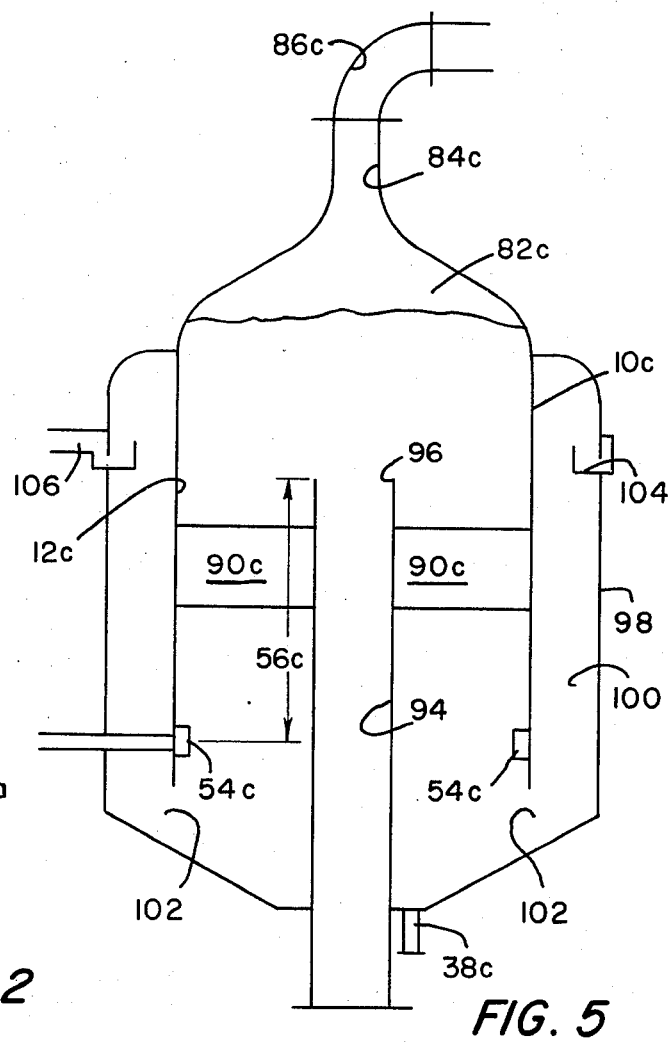
FIG. 5 is a view schematically depicting an apparatus constructed in accordance with still another alternative embodiment of the invention.

FIG. 5, wherein parts corresponding to those beforedescribed are designated by the similar reference numeral followed by the suffix c, illustrates an apparatus representing another modified embodiment of the invention. The apparatus shown in FIG. 5 is similar to that of FIGS. 2 and 3 in that it includes an outlet 84c for pressurized discharge of the sludge from the upper end of the clarifying chamber 12c and the chamber 12c may contain radial vanes 90c identical in function to the vanes 90. However, in the apparatus of FIG. 5, the influent water to be clarified is supplied through a supply means in the form of a conduit 94, projecting upwardly coaxially through the lower end of the chamber 12c and having an upper, open discharge end 96, the arrangements of the gas bubble/recycled carrier liquid supply nozzles 54c and the upper open discharge end 96 being the same as the beforedescribed arrangements thereof. Also, in the apparatus of FIG. 5, a vessel wall 98 surrounds the vessel 10c radially outwardly spaced therefrom by an annular chamber 100; at the lower end of the wall of the vessel 10c there is provided an annular opening 102 for discharging clarified liquid from the lower end of the clarifying chamber 12c contained within the vessel 10c to the chamber 100. Adjacent to the upper end of the annular chamber 100, there is provided an annular discharge trough 104, communicating with a discharge conduit 106. Hence, as will be seen, the clarified liquid discharged from the lower end of the clarifying chamber 12c flows upwardly in the chamber 100 to the annular trough 104 and then is discharged from the apparatus through the conduit 106.

The operation of the apparatus shown in FIG. 5 is, except as otherwise beforedescribed, identical to that of the earlier described apparatus, the nozzles 54c again being connected to receive a mixture of gas and recycled carrier liquid at least generally as shown in FIG. 1.

From the preceeding description it will be seen that the invention provides new and improved apparatus for clarifying an influent water.

It will be understood that the apparatus of the invention may be employed both for clarifying an influent water, such as sewage, where clean water is the desired product, and also for clarifying a mineral/liquid, fiber/liquid, or other slurry, where solids recovery is of paramount interest. Also, it will be understood that gases other than air could be employed for effecting the flotation separation.

Furthermore, it will be understood that, although only four embodiments of the invention have been illustrated and hereinbefore specifically described, the invention is not limited merely to these illustrated and described embodiments, but rather centemplates other embodiments and variations within the scope of the following claims.

Having thus described my invention, I claim:

1. Apparatus for clarifying an influent water, comprising a vessel containing a generally vertically elongated, totally enclosed, clarifying chamber, influent water supply means operatively associated with said clarifying chamber for supplying influent water into said clarifying chamber, said influent water supply means comprising influent water supply conduit means extending upwardly in said clarifying chamber and diffuser means in said clarifying chamber at a location substantially spaced above the lower end of said clarifying chamber, a second vessel, means operatively associated with said second vessel for supplying gas thereto for intermixture with carrier liquid therein, bubble-producing-and-discharge means for producing gaseous bubbles and discharging such bubbles intermixed with carrier liquid into said clarifying chamber, said bubble-producing-and-discharge means being operatively associated with said clarifying chamber for producing the gaseous bubbles immediately adjacent the discharge thereof into said clarifying chamber, said bubble-producing-and-discharge means comprising a plurality of discharge nozzles spaced around said clarifying chamber adjacent the periphery thereof and arranged for discharging the gaseous bubbles into said clarifying chamber in a direction at least generally transversely thereof, said discharge nozzles being substantially spaced longitudinally of said clarifying chamber below said diffuser means and also spaced longitudinally of said clarifying chamber above the lower end thereof, said discharge nozzles being more adjacent to the lower end of said clarifying chamber than to the upper end thereof, means communicating said discharge nozzles with said second vessel for supplying gas intermixed with carrier liquid from said second vessel to said discharge nozzles, said communicating means comprising a header extending around said vessel and conduits connecting said discharge nozzles to said header, valve means operatively associated with said conduits for controlling fluid flow therethrough, solid material discharge means operatively associated with said clarifying chamber for discharging solid material from adjacent the upper end thereof, liquid discharge means operatively associated with said clarifying chamber for discharging liquid from adjacent the lower end thereof, and conduit means communicating said clarifying chamber with said second vessel for supplying liquid discharged from said clarifying chamber to said second vessel for intermixture with gas therein, the portion of said clarifying chamber between said diffuser means and said discharge nozzles being free of transversely extending separating media to permit the supplied gaseous bubbles to readily rise in said clarifying chamber and cause upward movement of solid material contained in a supplied influent water while liquid in the influent water passes downwardly to said liquid discharge means.

2. Clarifying apparatus according to claim 1, further comprising means for supplying chemical to said clarifying chamber closely spaced above said discharge nozzles and separately from the supplied influent water and gaseous bubbles.

* * * * *